H. E. BORGER.
REGULATOR FOR ELECTRIC GENERATORS.
APPLICATION FILED MAY 8, 1918.
1,336,416. Patented Apr. 13, 1920.
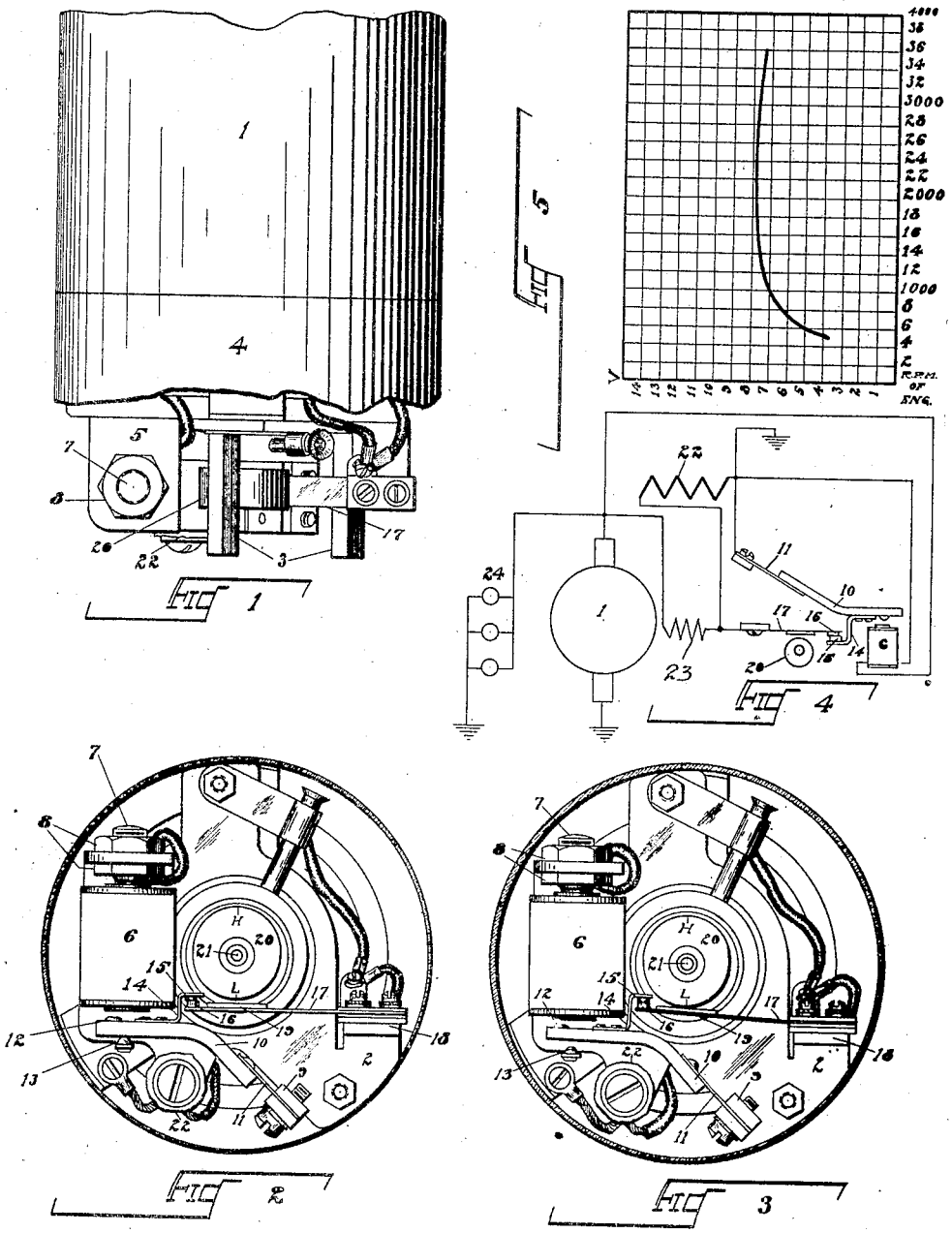
INVENTOR
HENRY E. BORGER
BY
Albion D. T. Libby
ATTORNEY

UNITED STATES PATENT OFFICE.

HENRY E. BORGER, OF NEWARK, NEW JERSEY, ASSIGNOR TO SPLITDORF ELECTRICAL COMPANY, OF NEWARK, NEW JERSEY.

REGULATOR FOR ELECTRIC GENERATORS.

1,336,416. Specification of Letters Patent. Patented Apr. 13, 1920.

Application filed May 8, 1918. Serial No. 233,362.

*To all whom it may concern:*

Be it known that I, HENRY E. BORGER, a citizen of the United States, residing at Newark, in the county of Essex and State of New Jersey, have invented certain new and useful Improvements in Regulators for Electric Generators, of which the following is a specification.

In lighting autovehicles, such as automobiles and motorcycles, the usual practice is to provide a storage battery and a generator for charging the battery and furnishing current to the lights and other devices when the vehicle is moving at a sufficient speed, an automatic device being used to connect and disconnect the generator to the battery when the voltage of the generator falls to a point not sufficient to maintain the charge to the battery. During the interval that the generator is disconnected from the battery the battery is furnishing current to the lights and other devices. In addition the generator is usually provided with a regulator or regulating means whereby the current will not exceed a predetermined value which is within the capacity of the generator.

The space for mounting a battery on a motorcycle is extremely limited and it is desirable to eliminate the battery entirely if the voltage of the generator could be regulated so that it will not rise to a value which will burn out the lights. On account of the wide range in speed of an autovehicle, particularly a motorcycle, the question of regulation of the generator becomes an important one even with the battery, and a much more difficult one when no battery at all is used.

It is the object of my invention to provide regulating means for a generator suitable for use on an autovehicle without the use of a storage battery.

My invention is directed to a "cam" type of regulator, which type has been used to some extent in the past, and it is, therefore, calculated to be an improvement on such type of regulators.

In the drawings, Figure 1 is a plan view of a portion of a generator with a part of the cover broken away to show the regulator parts.

Fig. 2 is an end view of Fig. 1 with certain parts of the regulator in a normal or no voltage position.

Fig. 3 is a similar view to Fig. 2 but with some parts in a different operative position.

Fig. 4 is a diagrammatic representation of a lighting system including my regulator.

Fig. 5 is a curve showing the operation of the generator with the regulator working.

Referring now to the various figures, wherein like numbers refer to corresponding parts, 1 illustrates a portion of a body of a generator, to the end bearing support of which a plate 2 is fastened by studs 3 which also serve to support the cover 4. The mounting plate 2 has a flange 5 formed thereon which supports an electromagnet 6, the same being adjustably mounted thereon by means of the threaded core 7 and nuts 8. The mounting plate 2 has an additional flange 9 formed thereon which carries an armature or movable member 10 through the medium of the flexible spring 11. The member 10 is so positioned and formed as to be acted on by the electromagnet 6 and has a non-magnetic rivet 12 set in the end of the member 10 to prevent the same from coming in magnetic contact with the end of the core 7. A stop 13 is punched outwardly from the mounting plate 2 for the purpose of definitely fixing the normal or no voltage position of the member 10. Mounted on the member 10 is a contact spring 14 carrying a contact 15 which is adapted to coöperate with a contact 16 carried on a movable member 17 which is preferably resilient in character. The member 17 is supported on but insulated from another flange 18 which is punched outwardly from the mounting plate 2. A bumper 19 is carried on the member 17 which bumper is preferably made of fiber. The bumper 19 is adapted to be acted on by a cam 20 carried on the end of the generator shaft 21. The mounting plate 2 also carries a resistance coil 22 which is connected in circuit with the shunt field 23 of the generator. In the normal or no voltage position of the movable member 10 it is seen that the resistance coil 22 is shunted by the contacts 15 and 16 through the medium of the members 14, 10 and 17 carrying said contacts. The cam 20 is made with a certain eccentricity so that it opens and closes the contacts 15 and 16 at least once every revolution of the generator shaft.

Considering now the operation of the regulator, it is seen from Fig. 2 that in the normal or no voltage position of the regulator parts, contacts 15 and 16 are in contact but slightly off-set and even when the high point H of the cam is turned 180 degrees bringing it in the position indicated by the low point L, the cam will not hit the bumper 19 under which condition the resistance 22 is shunted out of the generator field circuit thus allowing the generator to build up its voltage relatively quick and to a predetermined point, at which point the electromagnet 6 is energized to move the member 10 toward the electromagnet 6. This position of movement is indicated in Fig. 3 wherein it is seen that the contacts 15 and 16 are in line with each other and the bumper 19 is just barely touching the low point of the cam. It is seen that as the cam 20 is rotated by the generator shaft the contacts 15 and 16 will be opened and closed, it being understood that the member 17 has an upward tension which will allow the contact 16 to follow up the contact 15 as the member 10 is moved upward by the electromagnet 6 and furthermore it will cause the contacts 15 and 16 to close again after the high part H of the cam has passed the bumper 19. From the above described construction it will be seen that the regulator is dependent upon the speed of the generator and that the regulator is automatically brought into operation after a predetermined voltage of the generator has been reached thereby allowing the generator to give sufficient voltage to carry the lamp load 24 at a speed lower than it would if the contacts were opened and closed by the cam just as soon as the generator began to rotate, which condition exists in some of the cam regulators heretofore designed.

I have used a relatively light movable member 17 which reduces the wear on the bumper 19 as well as the wear on the cam 20 and by acting on the member 17 by the cam 20 at a point between the point of support and the contact carried by it, not so much eccentricity is required in the cam with consequent less wear of the parts. By arranging the movable member 10 so as to be acted on at its extremity by the magnet I secure a more efficient arrangement than in arrangements where the magnet acts near the point of support of the movable member and by the construction shown and described I secure a wiping operation of the contacts which keeps them clean.

The wiping action is continually present during the operation of the regulator for the reason that the movable member 10, carrying the contact 15, is in continual vibration after having once been moved to the position where the cam engages the bumper 19 due to the fact that the opening and closing of the contacts 15 and 16 by the cam changes the amount of magnetic flux through the electromagnet 6 and since the member 10 is carried on a flexible member 11 in the nature of a reed, the member 10 will have a rate of vibration depending on the speed of the generator. The amplitude of vibration will be, however, relatively small, but however small they are a certain amount of wiping action is obtained and this action keeps the contacts clean and keeps them from "freezing" together, due to any sparking that may be produced at the contacts.

From what has been said it will be understood that the effective value of the resistance in the field circuit varies with the speed of the rotation of the cam, hence with increasing speed the decreasing field strength compensates for the increased speed to maintain a substantially constant generator voltage.

It is to be understood that when the generator is running without load and no field the cam 20 does not engage the bumper 19 so there is no wear, during this condition of operation, on the cam, switching members and contacts 15 and 16 carried thereby.

While I have shown a preferred arrangement of various parts entering into my regulator, it will be understood that the various parts may be modified in shape and arrangement without departing from the spirit of my invention or the scope of the appended claims.

Having thus described my invention what I claim is:—

1. In a regulator for an electric generator, the combination of a cam operated by the rotating part of said generator, a pair of electrical contacts normally in engagement and in circuit with the field winding of the generator, a spring carrying one of said contacts and means for moving said spring to a position whereby it can be operated on by said cam to open and close said contacts, after the rotating part of the generator delivers a predetermined voltage.

2. In a regulator for an electric generator, the combination of a cam operated by the rotating part of said generator, a pair of electrical contacts normally in engagement and in circuit with the field winding of the generator, a spring carrying one of said contacts and a magnet for moving said spring to a position whereby it can be operated on by said cam to open and close said contacts, after the rotating part of the generator delivers a predetermined voltage.

3. In a regulator for an electric generator, the combination of a cam carried by the armature shaft of said generator, a pair of electrical contacts normally in engagement and in a parallel circuit with a resistance coil connected in circuit with the field winding of the generator, a movable member having a normal or no voltage position and carrying one of said contacts, a second movable member carrying the other of said contacts and adapted to be acted on by said cam but held out of engagement therewith by the first movable member when in its normal or no voltage position and means for moving both members at a predetermined voltage of the generator armature, to a point where the cam may act on the second mentioned movable member to open and close said contacts, for the purpose described.

4. In a regulator for an electric generator, the combination of a cam carried by the armature shaft of said generator, a pair of electrical contacts normally in engagement and in a parallel circuit with a resistance coil connected in circuit with the field winding of the generator, a movable member having a normal or no voltage position and carrying one of said contacts, a second movable member carrying the other of said contacts and adapted to be acted on by said cam but held out of engagement therewith by the first movable member when in its normal or no voltage position and electromagnetic means for acting on the first mentioned movable member at a predetermined voltage of the generator to move both movable members into a position where the cam will act on the second mentioned movable member to open and close said contacts for the purpose described.

5. In a regulator for an electric generator, the combination of a cam carried on the generator shaft, a mounting plate carried on the end frame of the generator, an electromagnet mounted on said plate and adapted to be energized by said generator at a predetermined voltage thereof, a movable member mounted on said plate and adapted to be moved by said electromagnet and a second movable member carried by said plate brought into position to be energized by said cam by the movement of the first mentioned movable member, a resistance coil carried by said plate and connected in circuit with the field winding of said generator and a pair of contacts carried by said movable member and connected across said resistance, said contacts being opened and closed by the rotation of said cam as and for the purpose described.

6. In a regulator for an electric generator, the combination of a cam carried on the end of the generator shaft, a mounting plate carried on the end frame of the generator, an electromagnet adjustably mounted on said plate and adapted to be energized by said generator at a predetermined voltage thereof, a movable spring member mounted on said plate and having a stop integral with the plate, said member having a normal or no voltage position against said stop but adapted to be drawn away from the stop by said magnet, a contact carried by said movable member, a second movable member carried on said plate and having a tendency to move in the opposite direction to the tendency movement of the first movable member, a contact carried by the said second movable member adapted to coöperate with the first mentioned contact, a resistance coil carried on said plate and connected in circuit with the field winding of the generator but normally shunted by said contacts, said cam acting to open and close said contacts after the first movable member has been moved by said magnet as and for the purpose described.

7. In a regulator for an electric generator, the combination of a cam operated by the shaft of said generator, a resistance in circuit with the field winding of the generator, a pair of contacts normally shunting said resistance and away from the influence of said cam and means responsive to a predetermined voltage of the generator for moving said contacts so they may be opened and closed by the rotation of said cam.

8. In a lighting system, a generator having a shunt field winding and a cam operated by the generator shaft, lights adapted to be connected directly to the generator terminals, a resistance, switching members connected to opposite ends of said resistance and normally in electrical contact to short circuit said resistance, said members being normally positioned so as to be out of the range of operation of said cam for the purpose described and means controlled by the voltage of the generator for moving the switching members to a position such that the cam will act in proportion to the speed of the generator shaft on one of said members to rapidly open and close the circuit around said resistance whereby the voltage across the lamps is held to a predetermined maximum value.

9. In a regulator for an electric generator, the combination of a cam operated by the shaft of said generator, a resistance in circuit with the field winding of the generator, a pair of contacts normally shunting said resistance and away from the influence of said cam and means responsive to a predetermined voltage of the generator for moving said contacts so they may be opened and closed by the rotation of said cam, said contacts being wiped together during their movement to a position where the cam acts on one of them for the purpose described.

10. In a regulator for an electric generator, the combination of a cam operated by the shaft of said generator, a resistance in circuit with the field winding of the generator, a pair of contacts normally shunting said resistance and away from the influence of said cam and means responsive to a predetermined voltage of the generator for moving said contacts so they may be opened and closed by the rotation of said cam, said means also serving to vibrate one of said contacts whereby said contacts are kept clean and from "freezing" together.

11. In a regulator for an electric generator, the combination of a cam carried by the armature shaft of said generator, a pair of electrical contacts normally in engagement and in a parallel circuit with a resistance coil connected in circuit with the field winding of the generator, a movable member having a normal or no voltage position and carrying one of said contacts, a second movable member carrying the other of said contacts and adapted to be acted on by said cam but held out of engagement therewith by the first movable member when in its normal or no voltage position and means for moving both members at a predetermined voltage of the generator armature, to a point where the cam may act on the second mentioned movable member to open and close said contacts, said means also serving to vibrate the first mentioned movable member after such predetermined voltage is reached whereby said contacts are kept in good working condition.

In witness whereof, I affix my signature.

HENRY E. BORGER.